US011923114B2

(12) United States Patent
Yang et al.

(10) Patent No.: US 11,923,114 B2
(45) Date of Patent: Mar. 5, 2024

(54) NDFEB ALLOY POWDER FOR FORMING HIGH-COERCIVITY SINTERED NDFEB MAGNETS AND USE THEREOF

(71) Applicant: Yantai Shougang Magnetic Materials Inc, Yantai (CN)

(72) Inventors: Kunkun Yang, Yantai (CN); Zhongjie Peng, Yantai (CN); Kaihong Ding, Yantai (CN)

(73) Assignee: Yantai Shougang Magnetic Materials Inc, Yantai (CN)

( * ) Notice: Subject to any disclaimer, the term of this patent is extended or adjusted under 35 U.S.C. 154(b) by 74 days.

(21) Appl. No.: 17/395,495

(22) Filed: Aug. 6, 2021

(65) Prior Publication Data

US 2022/0044854 A1 Feb. 10, 2022

(30) Foreign Application Priority Data

Aug. 8, 2020 (CN) ......................... 202010792268.9

(51) Int. Cl.
*H01F 1/057* (2006.01)
*B22F 1/05* (2022.01)
*B22F 1/17* (2022.01)

(52) U.S. Cl.
CPC .............. *H01F 1/0577* (2013.01); *B22F 1/05* (2022.01); *B22F 1/17* (2022.01); *B22F 2301/355* (2013.01); *B22F 2304/10* (2013.01)

(58) Field of Classification Search
None
See application file for complete search history.

(56) References Cited

U.S. PATENT DOCUMENTS

2020/0111591 A1* 4/2020 Ohashi .................. H01F 1/0577

FOREIGN PATENT DOCUMENTS

| | | | | |
|---|---|---|---|---|
| CN | 103456452 A | | 12/2013 | |
| CN | 106783129 A | | 5/2017 | |
| CN | 106783130 A | | 5/2017 | |
| CN | 107424697 A | | 12/2017 | |
| CN | 107546027 A | | 1/2018 | |
| CN | 108470615 A | | 8/2018 | |
| CN | 111243846 A | | 6/2020 | |
| EP | 2484464 A | | 8/2012 | |
| JP | 3028337 B2 | * | 7/1988 | ........... H01F 1/0572 |
| JP | H02125402 A | | 5/1990 | |

OTHER PUBLICATIONS

Corresponding CN application search results.
Corresponding EP application search results.

* cited by examiner

*Primary Examiner* — Xiaobei Wang
(74) *Attorney, Agent, or Firm* — Samson G. Yu

(57) ABSTRACT

The disclosure refers to a NdFeB alloy powder for forming high-coercivity sintered NdFeB magnets. The NdFeB alloy powder includes NdFeB alloy core particles with a multi-layered coating, wherein the multi-layered coating comprises:

a first metal layer directly disposed on the NdFeB alloy core particles, wherein the first metal layer consists of at least one of Tb and Dy;

a second metal layer directly disposed on the first metal layer, wherein the second metal layer consists of at least one of W, Mo, Ti, Zr, and Nb; and a third metal layer directly disposed on the second metal layer, wherein the third metal layer consists of (i) at least one of Pr, Nd, La, and Ce; or (ii) a combination of one of the group consisting of Cu, Al, and Ga and at least one of the group consisting of Pr, Nd, La, and Ce.

20 Claims, 1 Drawing Sheet

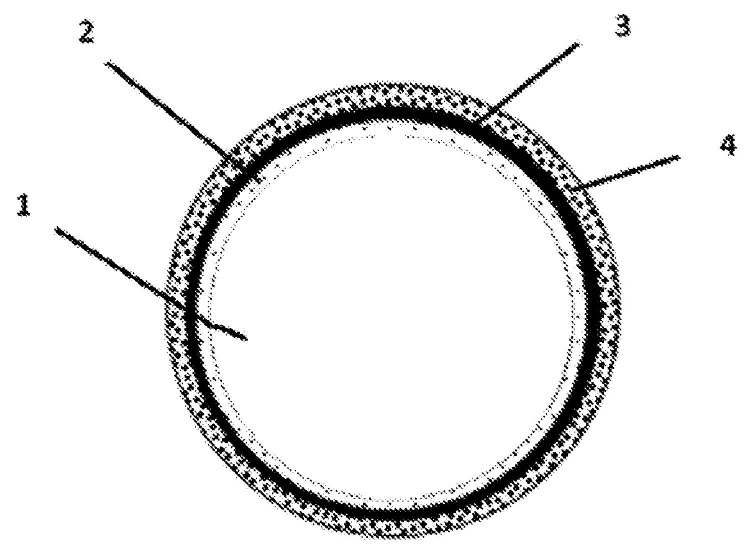
2
3
4
1

NDFEB ALLOY POWDER FOR FORMING HIGH-COERCIVITY SINTERED NDFEB MAGNETS AND USE THEREOF

TECHNICAL FIELD

The disclosure relates to the technical field of high-coercivity sintered NdFeB magnets, in particular to a NdFeB alloy powder for forming high-coercivity sintered NdFeB magnets and the use thereof.

BACKGROUND

NdFeB magnets are an important technical filed of rare earth applications and the demand for high-performance NdFeB magnet materials is still increasing. The coercivity of sintered NdFeB is a very important magnetic parameter and a sensitive parameter of the structure. It is mainly affected by the HA of the main phase grain of the magnet and the grain boundary between the main phase grains. The larger the HA of the main phase grains, the greater the final coercive force of the magnet, the wider and more continuous the grain boundary between the main phase grains, the higher is the coercive force of the magnet.

A way to increase the coercivity of NdFeB is to add the heavy rare earth elements (such as Dy, Tb, etc.) to the magnet alloy so as to increase the HA of the main phase crystal grains and thereby increase the coercive force of the magnet. However, heavy rare earth elements are expensive.

By grain boundary diffusion of the heavy rare earth element Dy/Tb, a (Nd, Dy, Tb)2Fe14B hard magnetized layer can be formed on the epitaxial layer of the grain surface to strengthen the demagnetization between the grains. The coupling effect can significantly increase the coercivity of the NdFeB magnet. For example, the double alloy method of light rare earth alloys such as Pr/Nd-Cu/Al or light rare earth auxiliary alloys through grain boundary diffusion utilizes the low melting point of light rare earth alloys, heat treatment at a temperature higher than its melting point, liquid diffusion occurs, and the main phase crystal. The particles are distributed in a thin-layer grid shape, which can achieve good isolation and demagnetization coupling of the main phase crystal particles, thereby improving the coercivity of the NdFeB magnet. However, the conventional rare earth grain boundary diffusion technology has the shortcomings of shallow diffusion depth and inability to diffuse thicker products. The conventional dual alloy technology cannot completely separate the main phase grains from the grain boundary phase, which leads to a small increase in the coercivity of the NdFeB magnet.

In the magnetic powder surface diffusion method, heavy rare earth film or light rare earth film is coated on the surface of NdFeB magnetic powder through coating and other methods, and then it is pressed and sintered to improve the coercivity of the NdFeB magnet. For example, patent document CN104124052A discloses the use of magnetron sputtering method to deposit light rare earth alloy on NdFeB magnet powder, followed by pressing and sintering, using the liquid diffusion of light rare earth alloy on the surface of the magnetic powder during the sintering process to expand. The grain boundary phase and the connecting grain boundary phase form a networked grain boundary distribution to prepare high-performance NdFeB sintered magnets. Patent document CN102280240A discloses the use of magnetron sputtering method to deposit Dy rare earth layer on the surface of NdFeB magnetic powder, and then press and sinter the magnet. During the sintering process the heavy rare earth element Dy on the surface of the magnetic powder diffuses. The hard magnetization layer strengthens the demagnetization coupling between crystal grains to prepare high-performance NdFeB sintered magnets. Patent document CN108766753A discloses the use of thermal resistance evaporation deposition method to deposit Dy/Tb particles and Pr/Nd particles on the surface of NdFeB magnetic powder sequentially or synchronously, and then press and sinter the mixed thin layer on the surface of the sintered magnetic powder. The process improves the distribution of rare-earth-rich phases in grain boundaries, increases the coercivity of NdFeB magnets, and increases the utilization of heavy rare earths.

The above-mentioned magnetic powder surface diffusion methods can all improve the coercivity of NdFeB magnets. However, due to the continuous diffusion and flow of rare earth elements in the magnetic powder during sintering and diffusion, direct contact between crystal grains of different main phases is very easy, which leads to different crystals. The solid phase diffusion between the grains leads to the growth of the grains. On the other hand, the uniform and continuous network grain boundary phases in the ideal state cannot be formed between the grains of different main phases, so that the demagnetization coupling effect of the grain boundaries is weakened. The coercivity of NdFeB magnets is not improved much.

SUMMARY

The purpose of the present disclosure is to solve the shortcomings of the traditional magnetic powder surface diffusion methods, in particular for further improving the coercivity of the sintered NdFeB magnet.

According to one aspect of the present disclosure there is provided a novel NdFeB alloy powder for forming high-coercivity sintered NdFeB magnets as defined in claim 1. The NdFeB alloy powder includes NdFeB alloy core particles with a multi-layered coating, wherein the multi-layered coating comprises:

a first metal layer directly disposed on the NdFeB alloy core particles, wherein the first metal layer consists of at least one of Tb and Dy;

a second metal layer directly disposed on the first metal layer, wherein the second metal layer consists of at least one of W, Mo, Ti, Zr, and Nb; and a third metal layer directly disposed on the second metal layer, wherein the third metal layer consists of (i) at least one of Pr, Nd, La, and Ce; or (ii) a combination of one selected from the group consisting of Cu, Al, and Ga and at least one selected from the group consisting of Pr, Nd, La, and Ce.

Another aspect of the present disclosure relates to the use of the NdFeB alloy powder for preparing a sintered NdFeB magnet.

Yet another aspect of the present disclosure refers to a sintered NdFeB magnet, which is produced from the modified NdFeB alloy powder.

Further aspects of the present disclosure could be learned from the dependent claims or following description.

BRIEF DESCRIPTION OF THE DRAWINGS

FIG. 1 is a schematic illustration of a particle of the inventive NdFeB alloy powder bearing multiple metal layers deposited on the surface.

DETAILED DESCRIPTION OF THE EMBODIMENTS

Reference will now be made in detail to embodiments. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

According to one aspect of the present disclosure there is provided a novel NdFeB alloy powder for forming high-coercivity sintered NdFeB magnets. The NdFeB alloy powder includes NdFeB alloy core particles with a multi-layered coating, wherein the multi-layered coating comprises:

a first metal layer directly disposed on the NdFeB alloy core particles, wherein the first metal layer consists of at least one of Tb and Dy;

a second metal layer directly disposed on the first metal layer, wherein the second metal layer consists of at least one of W, Mo, Ti, Zr, and Nb; and a third metal layer directly disposed on the second metal layer, wherein the third metal layer consists of (i) at least one of Pr, Nd, La, and Ce; or (ii) a combination of one selected from the group consisting of Cu, Al, and Ga and at least one selected from the group consisting of Pr, Nd, La, and Ce.

Compared with the prior art, the NdFeB alloy powder provides the following advantages:

By means of the high-temperature resistant second metal layer a barrier effect is achieved. The heavy rare earth elements of the first metal layer diffuse to the edge of the main phase thereby hardening the main phase grains. At the same time, the heavy rare earth elements are prevented from diffusing into the grain boundaries and causing waste of the expensive elements. Due to the high melting point, the elements of the intermediate second metal layer do not participate in the flow and diffusion process during the sintering process, which prevents the growth of grains and completely blocks the direct contact between the grains of different main phases. Further, the liquid phase diffusion of light rare earth elements on the surface of the main phase grains are promoted and a network is formed. The grain boundary structure further improves the coercivity of the sintered NdFeB magnet, so the NdFeB magnet obtained by using NdFeB alloy powder has a higher coercivity.

A Nd—Fe—B magnet (also known as MB or Neo magnet) is the most widely used type of rare-earth magnet. It is a permanent magnet made from an alloy of neodymium, iron, and boron to form the Nd2Fe14B tetragonal crystalline structure as a main phase. Besides, the microstructure of Nd—Fe—B magnets includes usually a Nd-rich phase. The alloy may include further elements in addition to or partly substituting neodymium and iron, which is however not important for the present disclosure far as the microstructure includes the main phase and the Nd-rich phase. In other words, a Nd—Fe—B magnet at presently understood covers all such alloy compositions. Because of different manufacturing processes, Nd—Fe—B magnets are divided into two subcategories, namely sintered Nd—Fe—B magnets and bonded Nd—Fe—B magnets. Conventional manufacturing processes for both subcategories usually include the sub-step of preparing Nd—Fe—B powders from Nd—Fe—B alloy flakes obtained by a strip casting process. The presently presented process refers to sintered Nd—Fe—B magnets.

The composition of the Nd—Fe—B powder may refer to the commercially available general-purpose sintered Nd—Fe—B grades. For example, its basic composition can be set to $RE_aT(1-abc)B_bM_c$, where RE is a rare earth element selected from at least one of Pr, Nd, Dy, Tb, Ho, and Gd, T is at least one of Fe or Co, B is element B, M is at least one of Al, Cu, Ga, Ti, Zr, Nb, Mo, and V, and a, b, and c may be 27 wt. %≤a≤wt. 33%, 0.85 wt. %≤b≤1.3 wt. %, and c≤5 wt. %.

Commercially available or freshly produced alloy powders could be used for the inventive process of preparing the Nd—Fe—B powders, respectively sintered Nd—Fe—B magnets. Specifically, Nd—Fe—B alloy flakes may be produced by a strip casting process, then subjected to a hydrogen embrittlement process and jet milling for preparing the desired Nd—Fe—B magnet powders, which are modified by depositing a multi-layered coating. The strip casting process, the hydrogen embrittlement process, and the jet milling process are currently well-known technologies. In other words, preparation and composition of the NdFeB alloy core particles is well-known in the art.

An average particle size D50 of the NdFeB alloy core particles is in the range of 2 to 6 μm, specifically in the range of 3 to 5 μm. The average particle size of the particles may be for example measured by a laser diffraction device using appropriate particle size standards. Specifically, the laser diffraction device is used to determine the particle size distribution of the particles, and this particle distribution is used to calculate the arithmetic average of particle size.

According to the present disclosure, the NdFeB alloy powders consists of NdFeB core particles on which a multi-layered coating is deposited. Specifically, starting from the surface of the core particle in this order said coating includes the first metal layer, the second metal layer, and the third metal layer. Some of preferably each of these layers may be formed by vapor deposition, in particular magnetron sputtering.

The first metal layer is directly disposed on the NdFeB alloy core particles. The first metal layer consists of at least one of heavy rare earth elements Tb and Dy. A thickness of the first metal layer maybe in the range of 1 to 50 nm, in particular in the range of 5 to 30 nm.

The second metal layer is directly disposed on the first metal layer. The second metal layer consists of at least one of W, Mo, Ti, Zr, and Nb. Preferably, the second metal layer consists of only one of W, Mo, Ti, Zr, or Nb. A thickness of the second metal layer may be in the range of 1 to 20 nm, in particular in the range of 5 to 15 nm.

The third metal layer is directly disposed on the second metal layer. According to a first alternative, the third metal layer consists of at least one of Pr, Nd, La, and Ce. Preferably, the third metal layer consists of Pr. According to a second alternative, the third metal layer consists of a combination of one selected from the group consisting of Cu, Al, and Ga and at least one selected from the group consisting of Pr, Nd, La, and Ce. Preferred combinations are PrNd, PrCu, NdAl, and PrGa. A thickness of the third metal layer may be in the range of 1 to 100 nm, in particular in the range of 10 to 40 nm.

According to one embodiment, the thickness of the third metal layer is greater than or equal to the thickness of the second metal layer.

According to another embodiment, the NdFeB alloy powder shows the above-mentioned thickness ranges of the first metal layer, the second metal layer, and the third metal layer. Furthermore, the average particle size D50 of the NdFeB alloy core particles of such a NdFeB alloy powder may be also in the above-mentioned range.

FIG. 1 illustrates schematically an exemplary NdFeB alloy core particle 1 with a multi-layered coating as described above. The first metal layer 2 is directly disposed on the NdFeB alloy core particle 1, the second metal layer 3 is directly disposed on the first metal layer 2, and the third metal layer 4 is directly disposed on the second metal layer 3.

The modified NdFeB alloy powder could be used for preparing a sintered NdFeB magnet. For example, such a preparation process may include the following steps:

a. NdFeB alloy raw materials for forming the NdFeB alloy core particles are smelted and quickly solidified to prepare NdFeB alloy flakes. The NdFeB alloy flakes are placed in a hydrogen treatment furnace. Hydrogen absorption treatment and high temperature dehydrogenation treatment is carried out for crushing the flakes into smaller particles. The crushed flakes particles are milled to NdFeB alloy powder by jet milling.

b. A vapor deposition method is used to form a multilayer film on the NdFeB alloy powder of step a. At least one of Tb/Dy is deposited first to form the first metal layer. Then the second metal layer is formed by deposition of at least one of W/Mo/Ti/Zr/Nb. Finally, the third metal layer is deposited, i.e. at least one of Pr/Nd/La/Ce is deposited or a combination of at least one of these elements and one of Cu/Al/Ga is deposited on the second metal layer.

c. The NdFeB alloy powder deposited with the three metal layers is formed by magnetic field orientation and cold isostatic pressing to a blank, which is vacuum sintered to obtain a high-coercivity sintered NdFeB magnet. The sintering temperature may be in the range of 1000° C. to 1150° C., and the sintering time may be 2 to 10 h. In particular, the sintering temperature may be 1050° C. to 1100° C. and the sintering time may be 4 to 6 h.

EMBODIMENTS

In the following embodiments, NdFeB alloy flakes are used based on raw materials of the same alloy ratio. The NdFeB alloy flakes are processed in the same way before the NdFeB alloy powder is made by jet milling. Specifically, the smelting preparation composition for preparing the NdFeB alloy flakes is Nd: 24.5%, Pr: 6.15%, Al: 0.2%, Co: 1.48%, Cu: 0.15%, Ga: 0.2%, B: 0.94% with the remaining composition being Fe. Hydrogen decrepitation of the NdFeB alloy flakes is performed in a furnace. 1% of the total alloy weight of an anti-oxidant and 0.2% of the lubricant are added to the crushed powder of the hydrogen decrepitation step, which is thoroughly mixed and placed in a jet mill for further crushing. Powders with different particle sizes are produced by jet milling in the following examples. A multilayer coating is disposed on these powders by vapor deposition.

Example 1

In this embodiment NdFeB alloy powder with an average particle size D50 of 2 μm is used and the aforementioned NdFeB alloy powder is divided into three batches, A, B, and C.

Powder A is not treated.

Powder B is coated with a Tb layer and a Pr layer successively by using a magnetron sputtering equipment to form a multilayer film on the surface of the powder. The average thickness of the Tb layer is 1 nm. The average thickness of the Pr layer is 10 nm.

Powder C is coated with a Tb layer, a W layer, and a Pr layer successively by using a magnetron sputtering equipment to form a multilayer film on the surface of the powder. The average thickness of the Tb layer is 1 nm, the average thickness W layer is 1 nm, and the average thickness of the Pr layer is 10 nm.

The three batches of NdFeB alloy powders of A, B and C are respectively oriented and formed in a 1.8 T magnetic field, and then subjected to 180 Mpa cold isostatic pressing to form blanks.

The blanks were vacuum sintered at 1000° C. for 10 hours, and then subjected to a primary tempering treatment at 850° C. for 6 hours and a secondary tempering treatment at 500° C. for 5 hours to produce three different sintered NdFeB magnets A, B and C.

After cutting the three magnets prepared above, their properties were tested and recorded in Table 1, and their performance differences were compared.

TABLE 1

| Sample | Br (T) | Hcj (kA/m) | Hk/Hcj |
|---|---|---|---|
| Magnet A | 1.4 | 1361 | 0.98 |
| Magnet B | 1.39 | 1528 | 0.98 |
| Magnet C | 1.39 | 1624 | 0.98 |

It can be seen from Table 1 that under the condition of the same composition of the NdFeB alloy powder, the coercivity of the sintered NdFeB magnet C prepared by using NdFeB powder C coated with three layers is 1624 KA/m, which is higher than that of NdFeB magnet B. The coercivity of the sintered NdFeB magnet B prepared by using NdFeB powder B coated with two layers is 1528 KA/m, which is higher than that of NdFeB magnet A, which is formed from a powder without any coating treatment.

Example 2

In this embodiment NdFeB alloy powder with an average particle size D50 of 3 μm is used and the aforementioned NdFeB alloy powder is divided into three batches, A, B, and C.

Powder A is not treated.

Powder B is coated with a Dy layer and a PrNd layer successively by using a magnetron sputtering equipment to form a multilayer film on the surface of the powder. The average thickness of the Dy layer is 5 nm. The average thickness of the PrNd layer is 15 nm.

Powder C is coated with a Dy layer, a Mo layer, and a PrNd layer successively by using a magnetron sputtering equipment to form a multilayer film on the surface of the powder. The average thickness of the Dy layer is 5 nm, the average thickness Mo layer is 10 nm, and the average thickness of the PrNd layer is 15 nm.

The three batches of NdFeB alloy powders of A, B and C are respectively oriented and formed in a 1.8 T magnetic field, and then subjected to 180 Mpa cold isostatic pressing to form blanks.

The blanks were vacuum sintered at 1050° C. for 6 hours, and then subjected to a primary tempering treatment at 850° C. for 6 hours and a secondary tempering treatment at 500° C. for 5 hours to produce three different sintered NdFeB magnets A, B and C.

After cutting the three kinds of magnets prepared above, their properties were tested and recorded in Table 2 to compare their performance differences.

TABLE 2

| Sample | Br (T) | Hcj (kA/m) | Hk/Hcj |
|---|---|---|---|
| Magnet A | 1.4 | 1337 | 0.98 |
| Magnet B | 1.39 | 1576 | 0.98 |
| Magnet C | 1.39 | 1791 | 0.98 |

It can be seen from Table 2 that under the condition of the same composition of the NdFeB alloy powder, the coercivity of the sintered NdFeB magnet C prepared by using NdFeB powder C coated with three layers is 1791 KA/m, which is higher than that of NdFeB magnet B. The coercivity of the sintered NdFeB magnet B prepared by using NdFeB powder B coated with two layers is 1576 KA/m, which is higher than that of NdFeB magnet A without any coating treatment of the powder.

Example 3

In this embodiment, NdFeB alloy powder with an average particle size D50 of 4.1 μm is used and the aforementioned NdFeB alloy powder is divided into three batches, A, B, and C.

Powder A is not treated.

Powder B is coated with a Dy layer and a Nd layer successively by using a magnetron sputtering equipment to form a multilayer film on the surface of the powder. The average thickness of the Dy layer is 10 nm. The average thickness of the Nd layer is 20 nm.

Powder C is coated with a Dy layer, a Mo layer, and a Nd layer successively by using a magnetron sputtering equipment to form a multilayer film on the surface of the powder. The average thickness of the Dy layer is 10 nm, the average thickness Mo layer is 5 nm, and the average thickness of the Nd layer is 20 nm.

The three batches of NdFeB alloy powders of A, B and C are respectively oriented and formed in a 1.8 T magnetic field, and then subjected to 180 Mpa cold isostatic pressing to form blanks.

The blanks were vacuum sintered at 1080° C. for 4 hours, and then subjected to a primary tempering treatment at 850° C. for 6 hours and a secondary tempering treatment at 500° C. for 5 hours to produce three different sintered NdFeB magnets A, B and C.

After cutting the three kinds of magnets prepared above, their properties were tested and recorded in Table 3 to compare their performance differences.

TABLE 3

| Sample | Br (T) | Hcj (kA/m) | Hk/Hcj |
|---|---|---|---|
| Magnet A | 1.405 | 1337 | 0.98 |
| Magnet B | 1.389 | 1632 | 0.98 |
| Magnet C | 1.385 | 1807 | 0.98 |

It can be seen from Table 3 that under the condition of the same composition of the NdFeB alloy powder, the coercivity of the sintered NdFeB magnet C prepared by using NdFeB powder C coated with three layers is 1807 KA/m, which is higher than that of NdFeB magnet B. The coercivity of the sintered NdFeB magnet B prepared by using NdFeB powder B coated with two layers is 1632 KA/m, which is higher than that of NdFeB magnet A.

Example 4

In this embodiment NdFeB alloy powder with an average particle size D50 of 5 μm is used and the aforementioned NdFeB alloy powder is divided into three batches, A, B, and C.

Powder A is not treated.

Powder B is coated with a Tb layer and a PrCu layer successively by using a magnetron sputtering equipment to form a multilayer film on the surface of the powder. The average thickness of the Tb layer is 30 nm. The average thickness of the PrCu layer is 40 nm.

Powder C is coated with a Tb layer, a Zr layer, and a PrCu layer successively by using a magnetron sputtering equipment to form a multilayer film on the surface of the powder. The average thickness of the Tb layer is 30 nm, the average thickness Zr layer is 15 nm, and the average thickness of the PrCu layer is 40 nm.

The three batches of NdFeB alloy powders of A, B and C are respectively oriented and formed in a 1.8 T magnetic field, and then subjected to 180 Mpa cold isostatic pressing to form blanks.

The blanks were vacuum sintered at 1100° C. for 8 hours, and then subjected to a primary tempering treatment at 850° C. for 6 hours and a secondary tempering treatment at 500° C. for 5 hours to produce three different sintered NdFeB magnets A, B and C.

After cutting the three kinds of magnets prepared above, their properties were tested and recorded in Table 4 to compare their performance differences.

TABLE 4

| Sample | Br (T) | Hcj (kA/m) | Hk/Hcj |
|---|---|---|---|
| Magnet A | 1.405 | 1337 | 0.98 |
| Magnet B | 1.39 | 1823 | 0.98 |
| Magnet C | 1.385 | 2093 | 0.98 |

It can be seen from Table 4 that under the condition of the same composition of the NdFeB alloy powder, the coercivity of the sintered NdFeB magnet C prepared by using NdFeB powder C coated with three layers is 2093 KA/m, which is higher than that of NdFeB magnet B. The coercivity of the sintered NdFeB magnet B prepared by using NdFeB powder B coated with two layers is 1823 KA/m, which is higher than that of NdFeB magnet A.

Example 5

In this embodiment, NdFeB alloy powder with an average particle size D50 of 5.3 μm is used and the aforementioned NdFeB alloy powder is divided into three batches, A, B, and C.

Powder A is not treated.

Powder B is coated with a Tb layer and a NdAl layer successively by using a magnetron sputtering equipment to form a multilayer film on the surface of the powder. The average thickness of the Tb layer is 50 nm. The average thickness of the NdAl layer is 100 nm.

Powder C is coated with a Tb layer, a Ti layer, and a NdAl layer successively by using a magnetron sputtering equipment to form a multilayer film on the surface of the powder. The average thickness of the Tb layer is 50 nm, the average thickness Ti layer is 20 nm, and the average thickness of the NdAl layer is 100 nm.

The three batches of NdFeB alloy powders of A, B and C are respectively oriented and formed in a 1.8 T magnetic field, and then subjected to 180 Mpa cold isostatic pressing to form blanks.

The blanks were vacuum sintered at 1150° C. for 2 hours, and then subjected to a primary tempering treatment at 850°

C. for 6 hours and a secondary tempering treatment at 500° C. for 5 hours to produce three different sintered NdFeB magnets A, B and C.

After cutting the three kinds of magnets prepared above, their properties were tested and recorded in Table 5 to compare their performance differences.

TABLE 5

| Sample | Br (T) | Hcj (kA/m) | Hk/Hcj |
|---|---|---|---|
| Magnet A | 1.402 | 1313 | 0.98 |
| Magnet B | 1.38 | 1934 | 0.98 |
| Magnet C | 1.374 | 2221 | 0.98 |

It can be seen from Table 5 that under the condition of the same composition of the NdFeB alloy powder, the coercivity of the sintered NdFeB magnet C prepared by using NdFeB powder C coated with three layers is 2221 KA/m, which is higher than that of NdFeB magnet B. The coercivity of the sintered NdFeB magnet B prepared by using NdFeB powder B coated with two layers is 1934 KA/m, which is higher than that of NdFeB magnet A.

Example 6

In this embodiment NdFeB alloy powder with an average particle size D50 of 6 μm is used and the aforementioned NdFeB alloy powder is divided into three batches, A, B, and C.

Powder A is not treated.

Powder B is coated with a Tb layer and a PrGa layer successively by using a magnetron sputtering equipment to form a multilayer film on the surface of the powder. The average thickness of the Tb layer is 10 nm. The average thickness of the PrGa layer is 1 nm.

Powder C is coated with a Tb layer, a Nb layer, and a PrGa layer successively by using a magnetron sputtering equipment to form a multilayer film on the surface of the powder. The average thickness of the Tb layer is 10 nm, the average thickness Nb layer is 1 nm, and the average thickness of the PrGa layer is 1 nm.

The three batches of NdFeB alloy powders of A, B and C are respectively oriented and formed in a 1.8 T magnetic field, and then subjected to 180 Mpa cold isostatic pressing to form blanks.

The blanks were vacuum sintered at 1100° C. for 5 hours, and then subjected to a primary tempering treatment at 850° C. for 6 hours and a secondary tempering treatment at 500° C. for 5 hours to produce three different sintered NdFeB magnets A, B and C.

After cutting the three kinds of magnets prepared above, their properties were tested and recorded in Table 6 to compare their performance differences.

TABLE 6

| Sample | Br (T) | Hcj (kA/m) | Hk/Hcj |
|---|---|---|---|
| Magnet A | 1.401 | 1321 | 0.98 |
| Magnet B | 1.392 | 1703 | 0.98 |
| Magnet C | 1.39 | 1775 | 0.98 |

It can be seen from Table 6 that under the condition of the same composition of the NdFeB alloy powder, the coercivity of the sintered NdFeB magnet C prepared by using NdFeB powder C coated with three layers is 1775 KA/m, which is higher than that of NdFeB magnet B. The coercivity of the sintered NdFeB magnet B prepared by using NdFeB powder B coated with two layers is 1703 KA/m, which is higher than that of NdFeB magnet A.

The above description is only exemplary and explanatory. The above examples show that the sintered NdFeB magnets prepared from sequentially plated NdFeB powders have an improved coercivity. Specifically, NdFeB core particles are coated with three layers of different metals, wherein the intermediate layer consists of at least one of W, Mo, Ti, Zr, and Nb, i.e. metal elements having a high melting point.

What is claimed is:

1. A NdFeB alloy powder for forming high-coercivity sintered NdFeB magnets, the NdFeB alloy powder including NdFeB alloy core particles with a multi-layered coating, wherein the multi-layered coating comprises:

a first metal layer directly disposed on the NdFeB alloy core particles wherein the first metal layer consists of at least one of Tb and Dy;

a second metal layer directly disposed on the first metal layer, wherein the second metal layer consists of at least one of W, Mo, Ti, Zr, and Nb; and a third metal layer directly disposed on the second metal layer, wherein the third metal layer consists of (i) at least one of Pr, Nd, La, and Ce; or (ii) a combination of one selected from the group consisting of Cu, Al, and Ga and at least one selected from the group consisting of Pr, Nd, La, and Ce.

2. The NdFeB alloy powder according to claim 1, wherein an average particle size D50 of the NdFeB alloy core particles is in the range of 2 to 6 μm.

3. The NdFeB alloy powder of according to claim 1, wherein a thickness of the first metal layer is in the range of 1 to 50 nm.

4. The NdFeB alloy powder of according to claim 2, wherein a thickness of the first metal layer is in the range of 1 to 50 nm.

5. The NdFeB alloy powder according to claim 1, wherein a thickness of the second metal layer is in the range of 1 to 20 nm.

6. The NdFeB alloy powder according to claim 2, wherein a thickness of the second metal layer is in the range of 1 to 20 nm.

7. The NdFeB alloy powder according to claim 1, wherein a thickness of the third metal layer is in the range of 1 to 100 nm.

8. The NdFeB alloy powder according to claim 2, wherein a thickness of the third metal layer is in the range of 1 to 100 nm.

9. The NdFeB alloy powder according to claim 4, wherein the thickness of the third metal layer is greater than or equal to the thickness of the second metal layer.

10. The NdFeB alloy powder according to claim 5, wherein the thickness of the third metal layer is greater than or equal to the thickness of the second metal layer.

11. The NdFeB alloy powder according to claim 1, wherein the first metal layer, the second metal layer, and the third metal layer are formed by vapor deposition.

12. A preparation process of a sintered NdFeB magnet using the NdFeB alloy powder according to claim 1, the preparation process includes the following steps:

subjecting the NdFeB alloy powder to magnetic field orientation and cold isostatic pressing to form a blank, and sintering the blank at a temperature of 1000° C. to 1150° C. for 2 to 10 hours in vacuum to obtain the sintered NdFeB magnet.

13. A sintered NdFeB magnet produced from the NdFeB alloy powder according to claim 1.

14. The NdFeB alloy powder of according to claim 3, wherein a thickness of the first metal layer is in the range of 5 to 30 nm.

15. The NdFeB alloy powder of according to claim 4, wherein a thickness of the first metal layer is in the range of 5 to 30 nm.

16. The NdFeB alloy powder according to claim 5, wherein a thickness of the second metal layer is in the range of 5 to 15 nm.

17. The NdFeB alloy powder according to claim 6, wherein a thickness of the second metal layer is in the range of 5 to 15 nm.

18. The NdFeB alloy powder according to claim 7, wherein a thickness of the third metal layer is in the range of 10 to 40 nm.

19. The NdFeB alloy powder according to claim 8, wherein a thickness of the third metal layer is in the range of 10 to 40 nm.

20. The NdFeB alloy powder according to claim 11, wherein the first metal layer, the second metal layer, and the third metal layer are formed by magnetron sputtering.

* * * * *